UNITED STATES PATENT OFFICE.

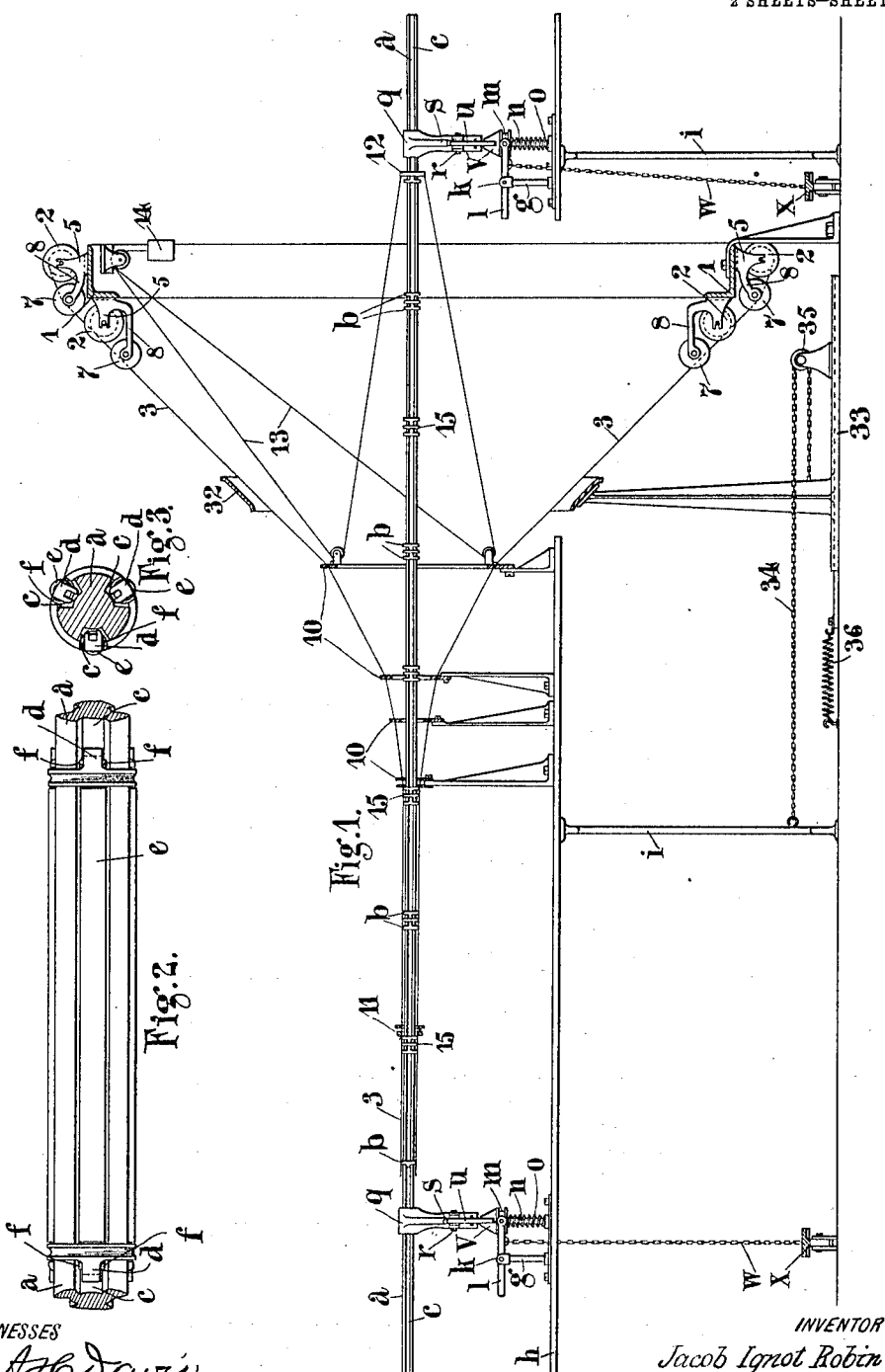

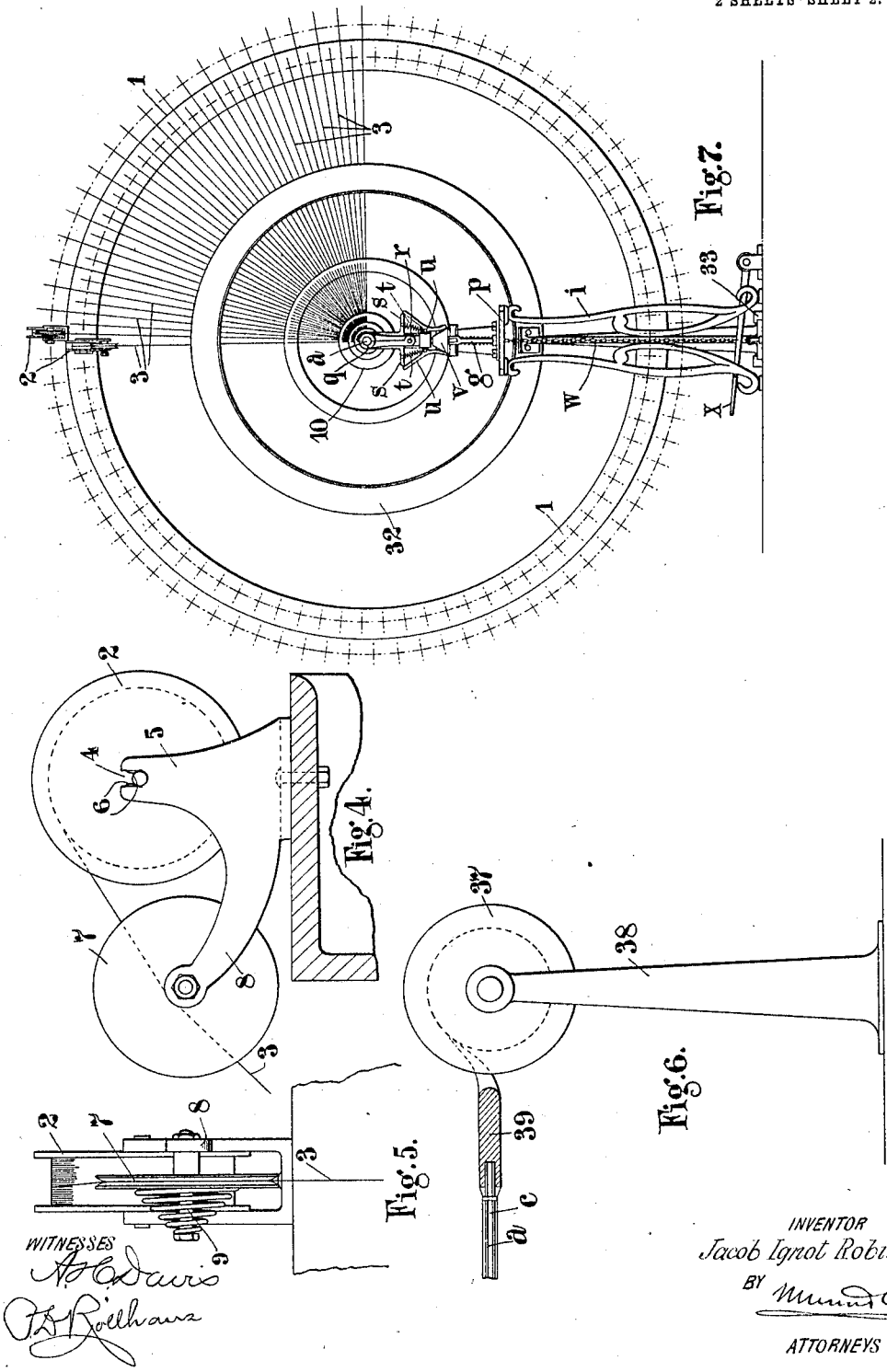

JACOB IGNOT ROBIN, OF LONDON, ENGLAND.

MACHINE FOR USE IN THE MANUFACTURE OF INCANDESCENT GAS-MANTLES.

1,048,430.   Specification of Letters Patent.   Patented Dec. 24, 1912.

Application filed October 8, 1910. Serial No. 585,992.

*To all whom it may concern:*

Be it known that I, JACOB IGNOT ROBIN, a citizen of the United States of America, and residing at 54 Cheapside, in the county of London, England, have invented a certain new and useful Improved Machine for Use in the Manufacture of Incandescent Gas-Mantles, of which the following is a specification.

This invention relates to the manufacture of incandescent gas mantles and while it is particularly applicable to mantles of the kind which are composed of loose strands or threads, it may also be applied to the manufacture of any ordinary form of mantle.

The object of the present invention is to devise means for the rapid and economical production of mantles without the necessity for employing skilled labor.

The invention comprises a method of manufacturing incandescent gas mantles in which the material for forming the mantles is fed, as required, along a rod or spindle, and secured to rings or mantle-holders mounted thereon, the mantles being, in some cases, removed in pairs from the rod or spindle and subsequently divided into two mantles in any suitable manner.

The accompanying drawings illustrate two modes of carrying out the invention.

Figure 1 is a side elevation showing one convenient form of apparatus for forming mantles made of strands or threads. Figs. 2 and 3 are an elevation and sectional end elevation showing a detail. Figs. 4 and 5 are respectively a side and end elevation of another detail. Fig. 6 illustrates a portion of one form of apparatus which may be employed when the mantle is to be formed of webbing or knitted fabric. Fig. 7 is an end elevation of Fig. 1.

In carrying my invention into effect in one convenient manner, as for example in its application to the manufacture of inverted incandescent gas mantles formed of separate strands or threads, I removably mount upon a rod or spindle $a$ any desired number of rings or holders $b$ to which the mantles are to be secured, the rings or holders $b$ being mounted upon the rod in pairs in such a manner that the parts of each pair of holders to which the mantles are to be attached are adjacent to one another. The rod or spindle $a$ may be formed to suit the type of mantle-holder employed, and in the construction described which is intended for inverted mantles, the rod or spindle is preferably formed with three longitudinal key ways or recesses $c$ in which the lugs $d$ of the mantle-holders $b$ are adapted to slide. The distance between the rings $b$ of each pair is regulated by the length of mantle required, and I may provide any convenient means such as pins, springs or the like for holding the rings in position on the bar, but I prefer to keep the rings $b$ in position by means of distance pieces $e$ (Fig. 2) which may take the form of tubes or rods, sliding in the recesses $c$, and are preferably provided at each end with jaws $f$ adapted to pass under and embrace the rings $b$ so as to minimize the risk of the distance pieces falling out should one of the rings $b$ become shifted from its position.

The rod or spindle $a$ may be supported in any desired manner, and in the preferred form the supports, whose members will, in general, depend upon the length of the bar $a$ are of such a form that they may be conveniently opened when required for the passage of the mantle-holders therethrough. They consist of a rod or arm $g$ carried by a slide $h$ supported on standards $i$, and pivoted at $k$ to the arm $g$ is a lever $l$ pivotally secured to a collar $m$ adapted to slide on a spindle $n$ but normally held in its upper position by means of a spring $o$ (Figs. 1 to 7). The jaws $q$ of the support are provided on their interior face with a pin (not shown) adapted to engage in holes in the bar $a$ when the jaws $q$ are closed and the latter are pivotally connected at $r$ and are provided with arm-like extensions $s$ held in their upper position against springs $t$ by means of the bent pivoted levers $u$ whose lower ends are engaged by a truncated cone or inclined cam surface $v$ formed integral with or secured to the collar $m$. The arrangement is such that when the lever $l$ is depressed it depresses the collar $m$ and allows the lower ends of the levers $u$ to move inward along the inclined surfaces of the cone $v$, thus allowing the arms $s$ to be drawn down by the springs $t$ and the jaws $q$ to open. Any convenient means may be employed for depressing the lever $l$, as for example, a chain or the like $w$ which is secured to a pivoted lever $x$ placed upon the floor and adapted to be pressed down by the operator's foot.

Mounted in a suitable position at or near one end of the rod $a$ is a ring or support 1 conveniently formed of angle-iron and adapted to support bobbins 2 on which is wound the thread 3, suitably impregnated, which is to form the mantles.

The number of bobbins 2 will depend upon the number of strands or threads to be used for each mantle, and in Fig. 1, for the sake of clearness, only four of such bobbins are shown, while in Fig. 7 the center lines only of the bobbins are indicated. The bobbins 2 may be conveniently mounted in slots 4 formed in brackets 5 secured to the ring or support 1, the bobbins being further held in place by means of springs 6. In conjunction with each bobbin I may, if desired employ a suitable tensioning device for the thread 3, such tensioning device conveniently taking the form of a pair of disks 7 mounted on an arm 8 formed integral with the bracket 5 and between which disks the thread passes. The pressure between the disks 7 may be regulated by means of an adjustable spring 9. The threads 3 are led from the bobbins through a series of rings 10 of decreasing diameter supported by the slide $h$ which is interrupted if required, for a portion of its length to make room for the bobbin support 1. The rings 10 are pierced with holes through which the threads, either singly or more than one, are adapted to pass, and where the number of threads is too great to allow of the holes for the threads being bored in a single line around the periphery of the ring of smallest diameter, this latter may consist of two rings, one of which has holes drilled in it for the reception of the threads while the other is plain and of sufficient internal diameter to allow the threads to just pass outside the rings or mantle-holders $b$ on the rod $a$. On tying or otherwise securing the threads or strands to the end mantle-holder $b$ on the rod, and pushing the rings and distance pieces forward thereon, the threads 3 will be drawn along and will form a kind of cage surrounding the rod and mantle holders. The operator now secures the threads in position upon the holders by any suitable means, for example, by tying them with a thread of asbestos, wire, or combination of asbestos and wire or other suitable material, the threads 3 being retained in position, if necessary, by means of an auxiliary guide ring 11, formed, as described with reference to the smallest of the rings 10, of two rings, one plain and one drilled with holes, adapted to be slid into position adjacent to each mantle-holder $b$ during the tying operation. If desired, the guide ring 11 may be provided with a spring finger adapted to be pressed onto the holder $b$ to press on the asbestos thread or the like during the tying operation. The rings or mantle-holders $b$ and distance pieces may be pushed forward on the rod $a$ by hand or automatically, for example by means of a ring 12 adapted to fit the rod behind the mantle-holders and to be pulled forward by an arrangement of cords 13 or the like and the counterweights 14. This ring 12, which may be made to open so as to allow of its passing over the mantle-holders, may be pulled back by hand or by a second arrangement of counterweights. As the rings or mantle-holders are pushed along the rod and the strands or threads tied thereon, the latter are separated by cutting between adjacent mantle-holders, which may be spaced apart if desired by means of wire or like rings 15, to facilitate the severing operation, and the pairs or rings $b$, with their threads attached, are removed from the rod for further treatment to form the finished mantles, as for example by tying the threads in two places on or near the middle point, and subsequently severing the threads between the point on which they are tied.

In carrying out the process described with reference to Figs. 1 and 7, it is sometimes necessary to tension the threads or strands on the rod $a$ without the necessity of winding up the bobbins, and this may be conveniently effected by means of a coned ring 32 adapted to be moved along a slide 33 into contact with the threads 3 by means of a chain 34 passing over a pulley or roller 35 and adapted to be depressed by the operator's foot, a spring 36 being employed for returning the coned ring 32 out of engagement with the threads.

Instead of tying the material to form the mantle to the mantle-holders and at the bottom of the mantle by means of asbestos or like thread, as above described, I may employ a suitable compound, such as are already known in connection with mantles, for fastening the material in position. For example, I may employ adhesive threads formed from a syrupy solution of thorium nitrate and collodion, or from thorium nitrate and silicate of soda, or from one or more of the following substances, namely, thorium nitrate, magnesium nitrate, aluminium nitrate, beryllium nitrate, ammonium nitrate and lanthanum nitrate.

Fig. 6 shows a simple form of apparatus which may be employed when the mantles are to be made from fabric. The knitted or other fabric is passed from a roll 37 mounted on a standard or standards 38 over a tube 39 of larger diameter than the bar $a$ having its diameter subsequently reduced by a reducing ring or rings as described in the first modification. The other steps in the process are also similar to those above described.

The various parts of the machine with which the inpregnated material is likely to come into contact are preferably made of aluminium or some other material which will not be acted upon by the impregnated salts.

It is to be understood that, with but slight modifications, my invention is equally applicable to the manufacture of upright mantles and in the case where such upright mantles are formed of strands or threads and may require a ring at both upper and lower ends those rings take the place of the mantle-holders above referred to.

My invention is capable of many variations in the herein described details, as it is not limited to any particular size or shape of mantle or mantle-holder, nor to any particular size or shape of support for the bobbins.

Having now described my invention what I claim as new and desire to secure by Letters Patent is:—

1. Apparatus for the manufacture of incandescent gas mantles comprising a spindle along which the material for forming the mantle may be continuously fed and carrying holders to which the material is secured and means for retaining the holders in their correct relative positions on such spindle.

2. Apparatus for the manufacture of incandescent gas mantles comprising a spindle along which the material for forming the mantle is continuously fed and carrying holders to which the material is secured and distance pieces arranged to retain said holders in their correct relative positions upon said spindle.

3. Apparatus for the manufacture of incandescent gas mantles comprising a spindle along which the material for forming the mantle is fed and carrying holders to which the material is secured, distance pieces for retaining the holders in correct relative position upon such spindles and means adjacent to the spindle for holding such material.

4. Apparatus for the manufacture of incandescent gas mantles comprising a spindle along which the material for forming the mantle is fed and carrying holders to which the material is secured and means for supporting such spindle adapted to open for the passage of the holders therethrough.

5. Apparatus for the manufacture of incandescent gas mantles comprising a spindle along which the material for forming the mantle is fed and carrying holders to which the material is secured, means adjacent to said spindle for supporting the material and means for supporting said spindle adapted to open for the passage of the holders therethrough.

6. Apparatus for the manufacture of incandescent gas mantles comprising a spindle along which threads are fed and carrying holders to which the threads are secured, means for supporting said spindle and a plurality of bobbins adjacent to said spindle for holding the separate threads from which the mantle is to be formed.

7. Apparatus for the manufacture of incandescent gas mantles comprising a spindle along which the separate threads are fed and carrying holders to which the threads are to be secured, means for supporting said spindle, a plurality of bobbins adjacent to said spindle for holding the separate threads and means for tensioning said threads.

8. Apparatus for the manufacture of incandescent gas mantles comprising a spindle along which separate threads are fed and carrying holders to which the threads are to be secured, means for supporting said spindle, means for retaining the holders in correct relative position on the spindle and a plurality of bobbins for holding the separate impregnated threads.

9. Apparatus for the manufacture of incandescent gas mantles comprising a spindle along which separate threads are fed and carrying holders to which the threads are to be secured, means adapted to open for supporting such spindle, distance pieces for retaining the holders in correct relative position on the spindle and a plurality of bobbins for holding the separate impregnated threads.

10. Apparatus for the manufacture of incandescent gas mantles comprising a spindle along which separate impregnated threads are fed and carrying holders to which the threads are secured, means adapted to open for supporting said spindles, a plurality of bobbins for holding the separate impregnated threads, distance pieces between said holders on such spindle and means for feeding the holders and distance pieces along the spindle.

11. Apparatus for the manufacture of incandescent gas mantles comprising a spindle along which separate impregnated threads are fed and carrying holders to which the threads are secured, means adapted to open for supporting said spindle, a plurality of bobbins for holding the separate impregnated threads, means for tensioning the threads, distance pieces between said holders and means for feeding the holders and distance pieces along the spindle.

12. Apparatus for the manufacture of incandescent gas mantles comprising a spindle along which the material for forming the mantles is fed, supporting jaws for said spindle and means for opening said jaws when required.

13. Apparatus for the manufacture of incandescent gas mantles comprising a spindle along which the material for forming the mantles is fed, pivoted supporting jaws for said spindle, levers adapted to keep said jaws closed against the action of a spring and means for releasing said levers when required.

In testimony whereof I have affixed my signature in the presence of two witnesses.

JACOB IGNOT ROBIN.

Witnesses:
W. WARREN TRIGGS,
BERTRAM H. MATTHEWS.

Copies of this patent may be obtained for five cents each, by addressing the "Commissioner of Patents, Washington, D. C."